(12) United States Patent
Takaki et al.

(10) Patent No.: US 7,552,453 B2
(45) Date of Patent: Jun. 23, 2009

(54) DISK DRIVING APPARATUS

(75) Inventors: Hitoshi Takaki, Kyoto (JP); Hisakazu Motomochi, Kyoto (JP); Eiji Miyamoto, Kyoto (JP); Takuya Yamane, Kyoto (JP)

(73) Assignee: Nidec Corporation, Kyoto (JP)

( * ) Notice: Subject to any disclaimer, the term of this patent is extended or adjusted under 35 U.S.C. 154(b) by 385 days.

(21) Appl. No.: 11/425,174

(22) Filed: Jun. 20, 2006

(65) Prior Publication Data

US 2006/0284497 A1 Dec. 21, 2006

(30) Foreign Application Priority Data

Jun. 20, 2005 (JP) ............... 2005-179291
Jun. 16, 2006 (JP) ............... 2006-167919

(51) Int. Cl.
*G11B 17/03* (2006.01)
(52) U.S. Cl. .................................... 720/604
(58) Field of Classification Search ........... 720/601, 720/604; 360/98.07, 99.07, 99.08, 99.12; 310/90, 90.5; 384/446
See application file for complete search history.

(56) References Cited

U.S. PATENT DOCUMENTS

| | | | |
|---|---|---|---|
| 5,463,511 A * | 10/1995 | Nakano et al. | 360/99.08 |
| 5,598,048 A * | 1/1997 | Dunfield et al. | 310/90.5 |
| 7,193,811 B2 * | 3/2007 | Leuthold et al. | 360/99.08 |
| 7,276,826 B2 | 10/2007 | Nishidate | |
| 7,290,268 B2 * | 10/2007 | Hoshino | 720/601 |
| 2003/0174915 A1 * | 9/2003 | Parsoneault et al. | 384/110 |
| 2003/0222523 A1 * | 12/2003 | Wang et al. | 310/90 |
| 2006/0083453 A1 * | 4/2006 | Okumura | 384/446 |
| 2006/0175921 A1 * | 8/2006 | Wang | 310/90.5 |
| 2008/0178204 A1 * | 7/2008 | Kuramoto et al. | 720/604 |

FOREIGN PATENT DOCUMENTS

| | | |
|---|---|---|
| JP | 4-12 A | 1/1992 |
| JP | 3048834 B2 | 10/1995 |
| JP | 8-51742 A | 2/1996 |
| JP | 10-146011 A | 5/1998 |
| JP | 11-262214 A | 9/1999 |
| JP | 3609952 B2 | 8/2000 |
| JP | 2006-6011 A | 1/2006 |
| JP | 4082699 B2 | 1/2006 |

* cited by examiner

*Primary Examiner*—Tianjie Chen
(74) *Attorney, Agent, or Firm*—Westerman, Hattori, Daniels & Adrian, LLP.

(57) ABSTRACT

A magnet disposed on the top face of an extended part of a bearing holding member has a semicircle shape as the maximum shaper and is disposed in the same direction as the movement direction of a disk dray in the circumferential direction. By the pulling force in the axial direction between the magnet and a rotor holder, the shaft tilts at an angle different from the gravity direction or a direction opposite to the gravity direction.

15 Claims, 6 Drawing Sheets

DISK DRIVING APPARATUS

BACKGROUND OF THE INVENTION

1. Field of the Invention

The present invention generally relates to a disk driving apparatus on which a brushless motor for driving a recording/reading disk is mounted.

2. Description of Related Art

In recent years, as a novel recording/reproducing method adapted to higher recording capacity of a blue-ray disc and an HD-DVD is employed, the demand for higher rotation accuracy of a recording/reading disk used for the method rises. In particular, to prevent erroneous operation in recording/reading and suppress rotation vibration of a recording/reading disk, there is a tendency that a mounting part of the brushless motor on which a recording/reading disk is to be mounted is requested to have run-out preventing accuracy which is about twice as high as that of conventional one. When a picture or design is drawn on a surface on the back of the recording surface of a recording/reading disk, the disk mounted on the mounting part may be rotated at low speed. It demands a brushless motor having the high rotation accuracy even when a recording/reading disk is rotated at low speed, particularly, at 100 rpm or lower.

Simultaneously, reduction in price of the brushless motor is demanded. Consequently, a slide bearing such as an oil-impregnated sintered bearing is recently being used as the bearing. When the slide bearing is used, however, a so-called half-speed whirl phenomenon that a frequency component which is the half of rotation speed conspicuously appears occurs. The phenomenon causes vibrations and irregular rotation; therefore hinders improvement in rotation. To prevent occurrence of the phenomenon, countermeasures are taken to prevent whirl of a rotary shaft by tilting the rotary shaft in one direction and supporting it with a bearing by a method of narrowing the gap between the rotary shaft and the bearing or a bias magnetic preloading method of applying a magnetic bias on one side.

In the method of narrowing the gap between the rotary shaft and the bearing, however, the highly-accurate tolerance are requested for the outside diameter of the rotary shaft and the inside diameter of the bearing, and the production cost increases dramatically. Further, when the rotary shaft and the bearing are inserted at the time of assembly, they come into contact with each other due to the narrow gap, and the slide bearing may be damaged. In addition, the bearing is cut by the contact between the rotation shaft and the bearing during rotation, and the gap may be widened with time.

In the method of applying the bias magnetic preload, when the bias magnetic preload direction is opposite to the gravity direction, the bias magnetic preload and the gravity cancel out each other, so that there is no point of applying the bias magnetic preload. Further, when the direction of the bias magnetic preload and that of the gravity are the same, an excessive force acts in one direction of the shaft, and the bearing is excessively cut. As a result, an influence may be exerted on the bearing life.

BRIEF SUMMARY OF THE INVENTION

According to one of the preferred embodiment of the present invention, whirl of a shaft and shortening of the life of a bearing of a sleeve is prevented by applying a bias magnetic preload generated by pulling the shaft downward in the axial direction by a magnetic force via a rotor holder in a direction which is different from the same direction as the gravity direction or the direction opposite to the gravity direction, in the circumferential direction. When the gravity direction and the direction of the bias magnetic preload are the same, the gravity is applied in addition to the force of the bias magnetic preload to the sleeve as the bearing, so that the bearing life is largely reduced. When the gravity direction and the bias magnetic preload direction are opposite to each other, the bias magnetic preload and the gravity cancel out each other, so that the shaft cannot be always tilted in a predetermined direction in the circumferential direction. Therefore, whirl of the shaft cannot be prevented. In particular, in the case of rotating a recording/reading disk at a low speed of 100 rpm or less to draw a picture or design on the side opposite to the recording surface of the recording/reading disk, whirl of the shaft appears conspicuously. However, by applying the bias magnetic preload, the whirl of the shaft can be prevented.

In other words, the direction of the bias magnetic preload is preferably the same as the movement directions of a drawer which inserts or draws a recording/reading disk in a disk driving apparatus. Particularly, the drawing direction of the drawer does not coincide with the gravity direction, so that it is preferable as the bias magnetic preload direction.

In the description of the preferred embodiments of the present invention, words such as upper, lower, left, right, upward, downward, top, and bottom for explaining positional relationships between respective members and directions merely indicate positional relationships and directions in the drawings. Such words do not indicate positional relationships and directions of the members mounted in an actual device.

Other features, elements, processes, steps, characteristics and advantages of the present invention will become more apparent from the following detailed description of preferred embodiments of the present invention with reference to the attached drawings.

DETAILED DESCRIPTION OF THE INVENTION

General Configuration of Optical Disk Apparatus

Figures 1A, 1B:
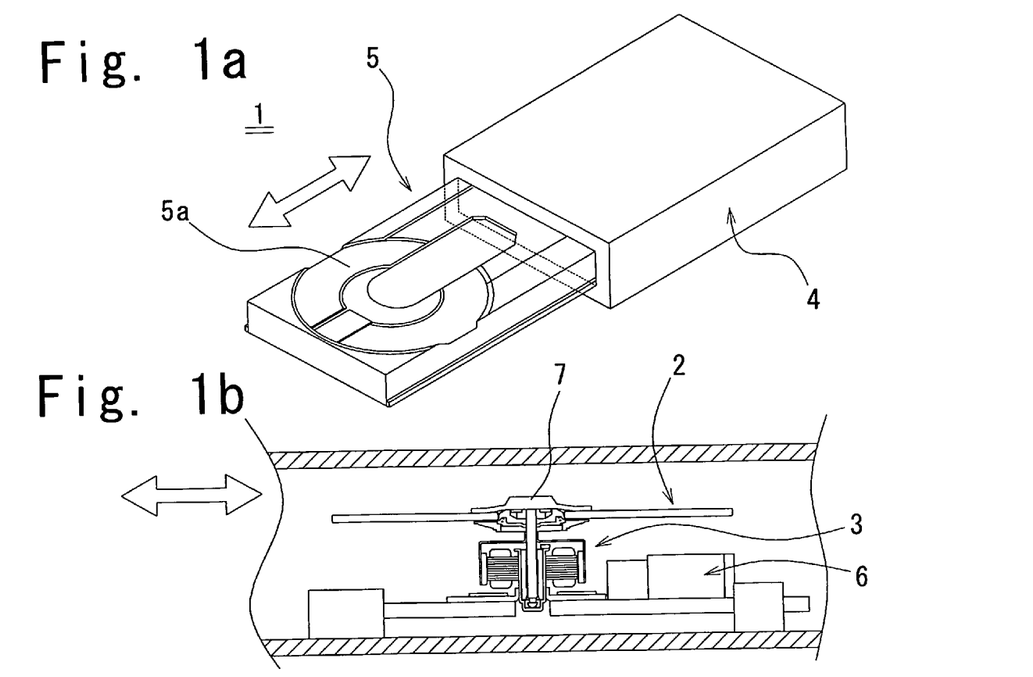
FIG. 1A is a perspective view showing a disk driving apparatus according to one preferred embodiment of the present invention.
FIG. 1B is a schematic cross sectional view along the axial direction showing the disk driving apparatus.

FIG. 1 is a schematic cross section of an optical disk driving apparatus 1 according to the preferred embodiment of the present invention. The vertical directions in the specification correspond to those of the drawings. FIG. 1A is a perspective view showing the exterior appearance of the optical disk driving apparatus 1, and FIG. 1B is a schematic cross section showing a part around a brushless motor 3 in a casing 4 which will be described later. The arrows in the Figs show the drawing directions of a disk tray 5 which will be described later.

With reference to FIGS. 1A and 1B, the optical disk driving apparatus 1 includes the casing 4 having an substantially rectangular shape on which a disc-shaped recording/reading disk 2 is mounted and the brushless motor 3 for rotating it are attached and fixed, the disk tray 5 as a drawer which can be enclosed in the casing 4 and which mounts the recording/reading disk 2 onto the brushless motor 3, an optical pickup 6 fixed to the casing 4 and recording or reading information to/from the recording/reading disk 2, and a clamp 7 for fixing the recording/reading disk 2 from above of it. The disk tray 5 has a disk mounting part 5a on which the recording/reading disk 2 is mounted and moves as shown by the arrows in FIG. 1A. The detailed drive and configuration are similar to, for example, those as described in Japanese Patent Publication No. 3,609,952.

General Configuration of Brushless Motor

Figure 2:
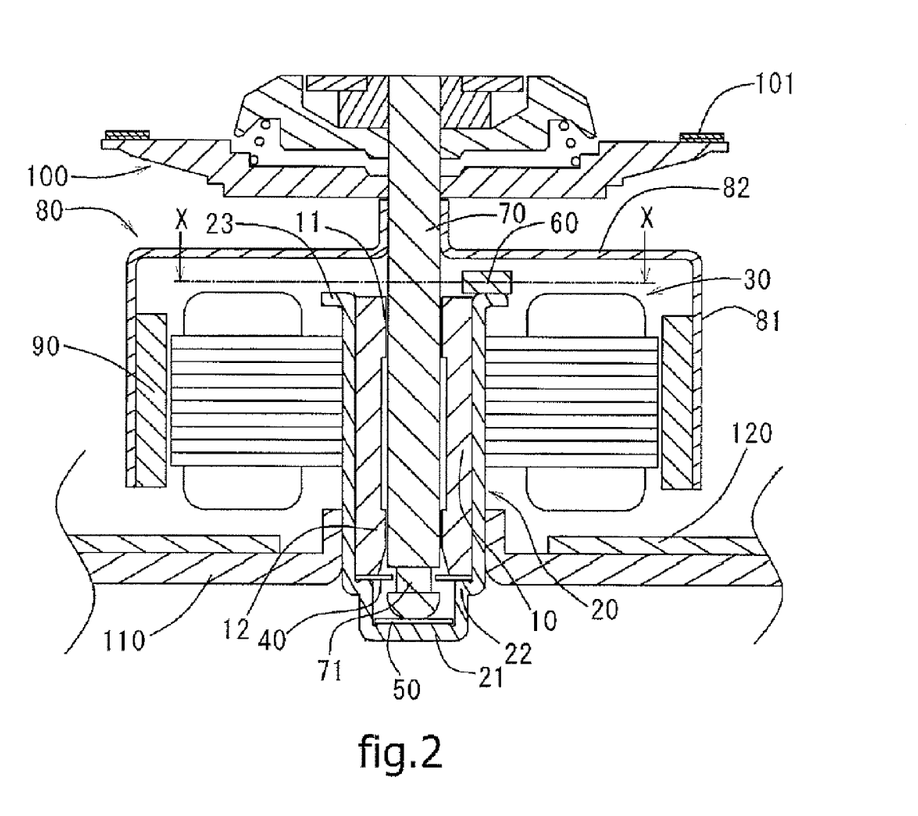
FIG. 2 is a schematic cross sectional view along the axial direction showing a brushless motor according to one preferred embodiment of the present invention.

A general configuration of the brushless motor 3 which is mounted on the optical disk driving apparatus 1 will be described. FIG. 2 is a schematic cross section of a brushless motor according to the preferred embodiment of the present invention.

Referring to FIG. 2, a sleeve 10 as a bearing has a substantially cylindrical shape and is formed by an oil-impregnated sintered member. On the inner peripheral face, an upper bearing part 11 and a lower bearing part 12, each of which have reduced inside diameter are formed in the vertical direction.

A bearing holding member 20 having a bottomed cylindrical shape is fixed on the outer peripheral face of the sleeve 10 so as to hold the sleeve 10. An annular stator 30 is fixed so as to be in contact with the cylindrical part of the bearing holding member 20.

A recess 21 having a diameter smaller than that of the cylindrical part is formed in the bottom of the bearing holding member 20. An annular-shaped retainer 40 acting as a retainer for a shaft 70 which will be described later is disposed in a step 22 acting as a coupling part between the cylindrical part and the recess 21. By abutting the lower end face of the sleeve 10 with the top face of the retainer 40, the position in the axial direction of the sleeve 10 is determined. Further, a disc-shaped washer 50 is disposed on the bottom face of the recess 21. The washer 50 is made of a resin material having high slidability and high abrasion resistance. An extended part 23 extending annularly to the outside in the radial direction is formed on the upper end face of the cylindrical part of the bearing holding member 20. A magnet 60 having a substantially arc circular shape is disposed on the top face of the extended part 23.

A shaft 70 is inserted along the inner peripheral face of the sleeve 10. The shaft 70 is rotatably supported by the sleeve 10. A rotor holder 80 obtained by forming a steel plate made of a ferromagnetic material in a covered cylindrical shape is fixed to the upper part of the shaft 70. The rotor holder 80 is formed by plastic working such as press working. An annular-shaped rotor magnet 90 is fixed by an adhesive to the inner face of a cylindrical part 81 of the rotor holder 80 so as to face the outer peripheral face of the stator 30 with a small gap in the radial direction.

Above the rotor holder 80 of the shaft 70, a turn table 100 on which the recording/reading disk 2 is to be mounted is fixed. A rubber 101 for preventing rotation shift of the recording/reading disk 2 is fixed on the top face at the edge of the turn table 100. The rubber 101 is made of a material having a high coefficient of friction and is fixed to the turn table 100 via an adhesive.

A step 71 having an outside diameter in the radial direction smaller than that of the shaft 70 is formed in a lower part of the shaft 70. By overlap in the axial direction between the step 71 and the retainer 40, a retaining function is obtained. The lower end face of the shaft 70 is formed in a hemisphere shape. The lower end face of the shaft 70 having the hemisphere shape and the top face of the washer 50 are in contact and slide each other.

To a lower cylindrical part of the bearing holding member 20, a mounting plate 110 which can be mounted on a fixing member 7 (refer to FIG. 1B) provided in the casing 4 of the optical disk driving apparatus 1 is fixed by a fixing member such as a screw (not shown). A circuit board 120 for controlling the rotation of the brushless motor 3 is fixed on the top face of the mounting plate 110.

By applying current to the stator 30 from an external power source, magnetic fields are generated around the stator 30. By the interaction between the magnetic fields and the rotor magnet 90, the brushless motor 3 is rotated.

Main Part

Figure 3:
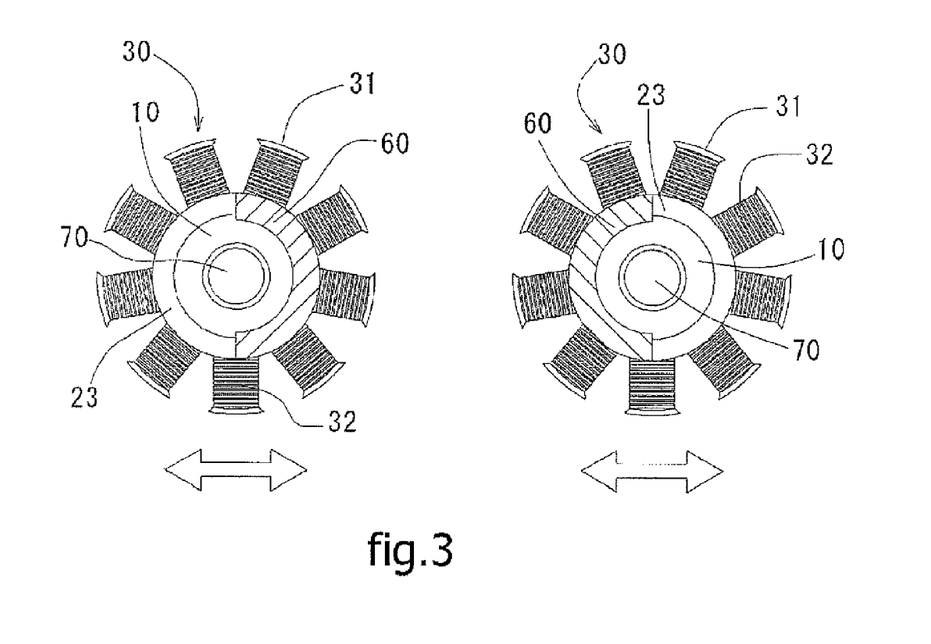
FIG. 3 is a cross sectional view along line X-X shown in FIG. 2.
Figure 4:
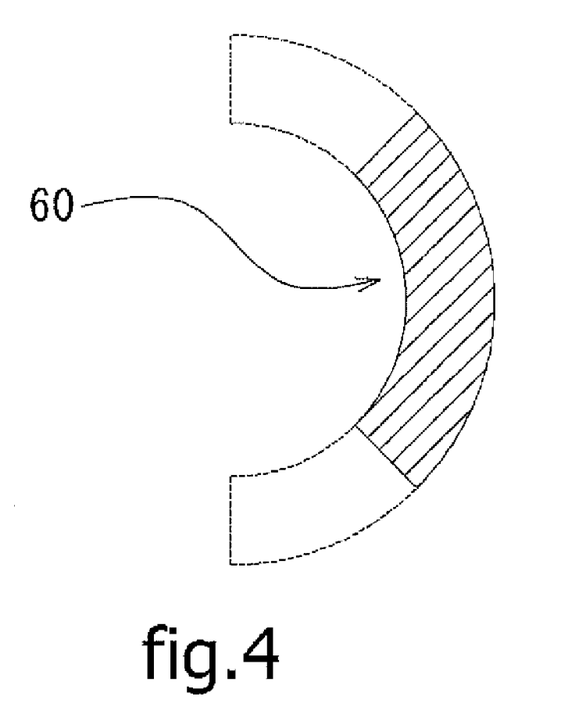
FIG. 4 is a top view of a magnet mounted on the brushless motor of FIG. 2.

The main part of the present invention will now be described by referring to FIGS. 2 to 4. FIG. 3 is a schematic cross sectional view of the brushless motor 3 seen from the X-X direction of FIG. 2. The arrows in FIG. 3 show the drawing directions of the disk tray 5. FIG. 4 is a top view of the magnet 60. The dot lines in FIG. 4 show the maximum range in which the magnet 60 can be formed.

Referring to FIG. 2, the magnet 60 disposed on the top face of the extended part 23 of the bearing holding member 20 makes the rotor holder 80 tilted toward the magnet 60 by magnetically pulling the under face of a cover 82 of the rotor holder 80 facing the top face of the magnet 60 in the axial direction to the lower side in the axial direction. That is, the magnet 60 generates bias magnetic preload. Therefore, the shaft 70 can be always tilted toward the magnet 60 side and a small gap between the outer peripheral surface of the shaft 70 and the inner peripheral surface of the upper bearing part 11 of the sleeve 10 becomes substantially zero. With the configuration, as compared with the case where the shaft 70 is whirlable all around, that is, the case where there is a small gap between the outer peripheral surface of the shaft 70 and the inner peripheral surface of the upper bearing part 11 of the sleeve 10, run-out of the shaft 70 can be suppressed further. By suppressing the run-out of the shaft 70, generation of the half speed whirl phenomenon can be suppressed. Moreover, erroneous operation in recording and reading caused by whirling of the recording/reading disk 2 which particularly conspicuously occurs in low speed rotation such as 100 rpm or less can be prevented. By fixing the shaft 70 in predetermined one direction in the circumferential direction tilted by the magnet 60, occurrence of a phenomenon such as irregular rotation caused by whirling of the shaft 70 can be also suppressed.

Referring to FIG. 3, the layout position of the magnet 60 in the optical disk driving apparatus 1 will be described.

In the stator 30, a plurality of teeth 31 extending radially outward are formed at equal intervals in the circumferential direction in a core back part (not shown). A coil 32 is provided around each of the teeth 31.

The magnet 60 is attached in the same direction as the movement directions of the disk tray 5 shown by the arrows. Preferably, the maximum pulling force to the lower side in the axial direction of the rotor holder 80 is applied by the magnet 60 at an angle except for the angle perpendicular to the movement directions of the disk tray 5 in the circumferential direction.

Although the optical disk driving apparatus 1 is disposed in various directions, the movement directions of the disk tray 5, particularly, the drawing direction of the disk tray 5 and the gravity direction do not coincide with each other. Therefore, when the magnet 60 is disposed so that the maximum pulling force to the lower side in the axial direction of the rotor holder 80 is applied in the direction in which the disk tray 5 is pulled to the outside of the casing 4, the shaft 70 can be tilted with reliability. Since whirling of the shaft 70 can be suppressed in the single brushless motor 3, the half-speed whirl phenomenon can be suppressed. However, in the case where the magnet 60 is attached in a wrong direction to the optical disk driving apparatus 1, the gravity direction and the maximum pulling force to the lower side in the axial direction of the rotor holder 80 may become opposite to each other. In the case where the maximum pulling force of the magnet 60 is applied in the direction opposite to the gravity direction, the maximum pulling force of the magnet 60 and the gravity cancel out each other, and there is the possibility that suppression of whirl of the shaft 70 as the role of the magnet 60 cannot be performed. As a result, the shaft 70 whirls in the state of the optical disk driving apparatus 1, and erroneous operation occurs in recording/reading of the recording/reading disk 2 due to the half speed whirl phenomenon.

Further, in the case where the maximum pulling force of the magnet 60 is applied in the same direction as the gravity direction in the circumferential direction, tilt due to the dead loads of the shaft 70, the rotor holder 80, the rotor magnet 90, the turn table 100, and the recording/reading disk 2 and the pulling force of the magnet 60 are added, so that excessive force may act on the sleeve 10. As a result, the sleeve 10 is excessively cut due to the contact between the sleeve 10 and the shaft 70. It causes a problem such that the bearing life is largely reduced and a problem such that chips of the sleeve 10 enter between the shaft 70 and the sleeve 10 and seize is caused.

To prevent the problems, it is suitable to set the position of disposing the magnet 60, that is, the position of tilting the shaft 70 to a direction other than the gravity direction and the direction opposite to the gravity direction, in the circumferential direction.

Referring to FIG. 4, the shape of the magnet 60 will be described.

The magnet 60 is formed in an arc shape and is positioned in a direction different from the gravity direction. The maximum shape of the magnet 60 is a semicircle. A shape larger than a semicircle is not proper since there is the possibility that attraction force generated by the bias magnetic preload becomes excessive and that the direction of the bias magnetic preload overlaps the gravity direction. The magnet 60 can move in the range it does not overlap the gravity direction or the direction opposite to the gravity direction.

OTHER EMBODIMENTS

Figure 5:
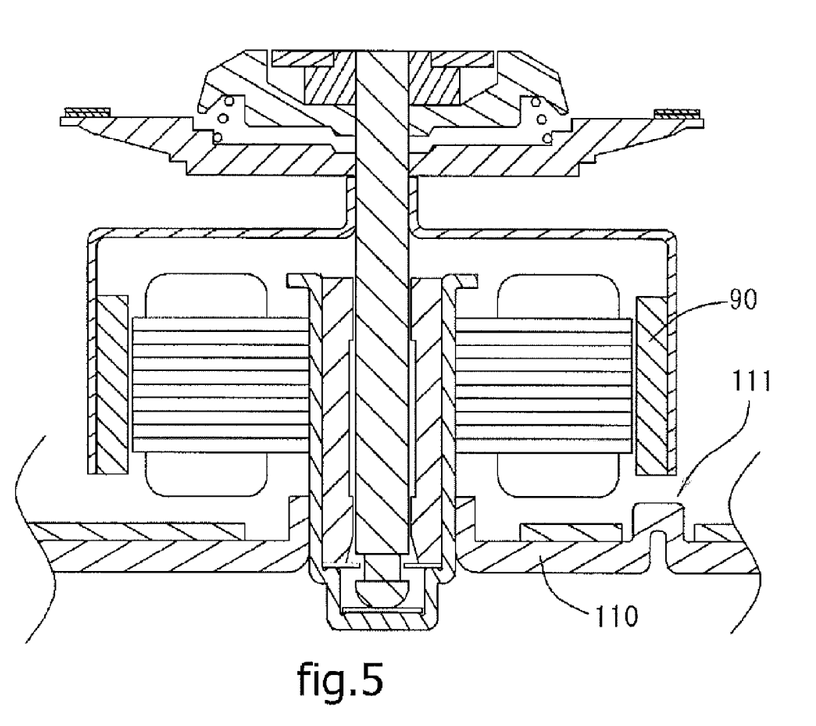
FIG. 5 is a schematic cross sectional view along the axial direction of the brushless motor according to another preferred embodiment of the present invention.
Figure 6:
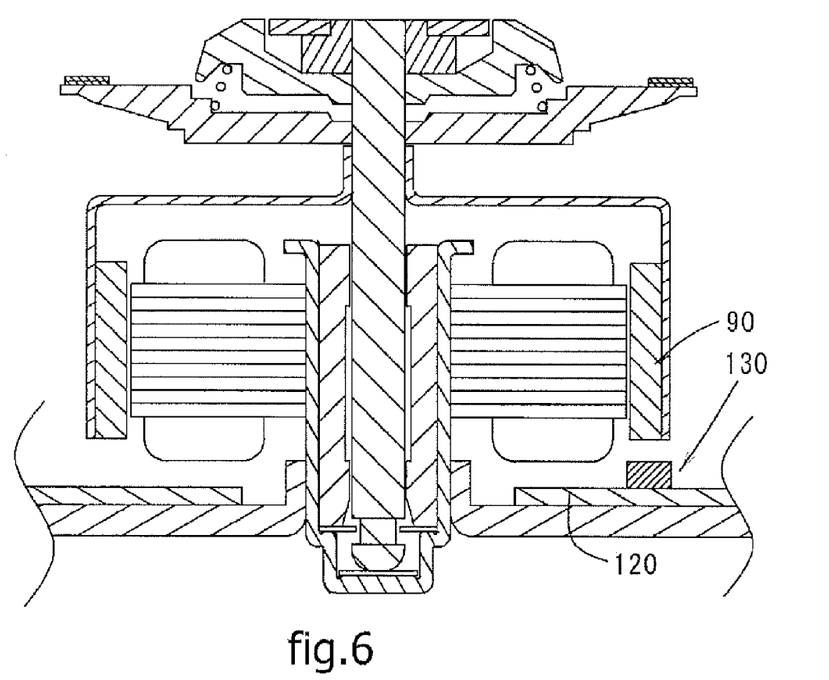
FIG. 6 is a schematic cross sectional view along the axial direction showing another example of the brushless motor according to the invention.

FIGS. 5 and 6 are diagrams showing the preferred embodiments of the present invention in which the bias magnetic preload is applied by methods other than the magnet 60. Since the configuration of the brushless motor 3 is similar except for the magnet 60, the description of the configuration of the brushless motor 3 will not be repeated. Only a part in which the bias magnetic preload is applied will be described here.

Referring to FIG. 5, the mounting plate 110 is formed by a metal plate made of a magnetic metal. A projected part 111 which projects upward in the axial direction is formed just below the rotor magnet 90 of the mounting plate 110. Therefore, attracting force of moving the rotor magnet 90 downward in the axial direction works between the rotor magnet 90 and the projected part 111 of the mounting plate 110, and bias magnetic preload is generated. The disposing position in the circumferential direction of the projected part 111 is similar to that in the magnet 60.

Referring to FIG. 6, another magnet 130 may be also disposed on the top face of the circuit board 120 and axially below the rotor magnet 90. With the configuration, attracting force which moves the rotor magnet 90 downward in the axial direction works between the rotor magnet 90 and the magnet 130, and bias magnetic preload is generated. The disposing position in the circumferential direction of the magnet 130 is similar to that in the magnet 60. Similar effects can be exerted by disposing a ferromagnetic body in place of the magnet 130.

Although the embodiment of the invention has been described above, the invention is not limited to the embodiment but can be variously modified.

For example, the maximum shape of the magnet 60 is a semicircle in the foregoing embodiment of the invention. The invention is not limited to the shape. It is sufficient that the part having strong magnetism of the magnet 60 has a semicircle shape at the maximum. Therefore, it is sufficient to form the magnet 60 in an annular shape and make a semicircle part have strong magnetism at the maximum. With the arrangement, the contact area between the magnet 60 and the bearing holding member 20 increases, so that the fixing strength can be improved. As a result, resistance to an external shock and the like can be improved.

While preferred embodiments of the present invention have been described in the foregoing, the present invention is not limited to the preferred embodiments detailed above, in that various modifications are possible. Only selected preferred embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the preferred embodiments according to the present invention is provided for illustration only, and not for limiting the invention as defined by the appended claims and their equivalents.

What is claimed is:

1. A motor for disk driving apparatus comprising:
   a rotator rotating about a rotation axis, the rotator being at least partially made of a magnetic metal material;
   a fixing part rotatably supporting the rotator; and
   a magnetic preload magnet disposed close to the rotator to an extent that a necessary magnetic attraction force can be generated and attached to the fixing part,
   wherein the disk driving apparatus includes a disk tray capable of moving in two ways along one direction perpendicular to the rotation axis, wherein the disk tray can be drawn to the outside of the disk driving apparatus, and
   wherein the magnetic attraction force in the rotation axis direction acting between the magnetic preload magnet and the rotator tilts the rotator along the one direction with respect to the rotation axis.

2. The motor according to claim 1, wherein the magnetic preload magnet is fixed to the fixing part so as to face a part of the rotator made of the magnetic metal material in the axial direction.

3. The motor according to claim 2, wherein the magnetic preload magnet is formed in an arc shape which is a semicircle at the maximum.

4. The motor according to claim 2, wherein the magnetic preload magnet is formed in an annular shape, the rotator is tilted by magnetic force applied thereto from the magnetic preload magnet, and a direction to which the rotator is tilted is along the one direction of the disk tray.

5. The motor according to claim 1, wherein a position in which the magnetic preload magnet acts the most is in a direction in which the disk tray is drawn to the outside of the disk driving apparatus in the one direction of the disk tray with respect to the rotation axis.

6. The motor according to claim 1, wherein the rotator is rotatably supported by a sleeve formed by an oil-impregnated sintered body.

7. The motor according to claim 1, wherein the direction in which the rotator tilts with respect to the rotation axis is not a direction opposite to the gravity direction.

8. The motor according to claim 1, wherein the motor has a low-speed rotation mode of rotating a recording/reading disk at 100 rpm or lower.

9. The motor according to claim 1, further comprising:
a sleeve in an substantially cylindrical shape formed by an oil-impregnated sintered body rotatably supporting the rotator,
wherein the rotator includes a rotor magnet which rotates about the rotation axis and a rotor holder for holding the rotor magnet,
wherein the fixing part is made of a magnetic material and includes a bearing holding part in an substantially cylindrical shape for holding an outer peripheral surface of the sleeve,
wherein the rotor holder has a cylindrical part for holding the rotor magnet and a cover face covering the sleeve,
wherein the magnetic preload magnet is disposed close to the cover face of the rotor holder to an extent that a necessary magnetic attraction force is generated and the magnetic preload magnet is fixed on the upper end face of the bearing holding part, and
wherein the magnetic attraction force in the rotation axis direction acting between the magnetic preload magnet and the rotator tilts the rotator in a direction in which the disk tray is drawn to the outside of the disk driving apparatus, in the one direction with respect to the rotation axis.

10. The motor according to claim 9, wherein the motor has a low-speed rotation mode of rotating a disk at 100 rpm or lower.

11. A disk driving apparatus including the motor according to claim 1, wherein the disk driving apparatus can be detachably attached a disc-shaped disk, comprising:
a casing enclosing the disk;
wherein the rotator is disposed in the casing and rotates about a rotation axis with respect to the casing, wherein the disk is detachably attached to the rotator, and
wherein the disk tray has a disk mounting part on which the disk is to be mounted, and the disk tray can move between a position in which the center of the disk mounted on the disk mounting part substantially coincides with the rotation axis and a position where the disk can be ejected to the outside of the casing.

12. A motor for a disk driving apparatus comprising:
a rotator rotating about a rotation axis and having a rotor magnet which rotates about the rotation axis; and
a fixing part rotatably supporting the rotator, a material of the fixing part being at least partially a magnetic material, and
wherein a part of the magnetic material in the fixing part faces a part of the rotor magnet in the rotation axis direction, and the part of the magnetic material in the fixing part is close to the rotor magnet more than the other part of the fixing part axially facing the rotor magnet,
wherein the disk driving apparatus includes a disk tray capable of moving in two ways along one direction perpendicular to the rotation axis, and
wherein a part in which a magnetic attraction force in the rotation axis direction acting between the rotor magnet and the part of the magnetic material in the fixing part is biased to either side along the one direction with respect to the rotation axis.

13. The motor according to claim 12, wherein the magnetic material of the fixing part is a magnetic metal plate, and
a projected part is formed by performing press work on the magnetic metal plate and is arranged close to the rotor magnet.

14. The motor according to claim 13, wherein the projected part is formed in an arc shape having a diameter which is substantially the same as that of the rotor magnet.

15. A disk driving apparatus including the motor according to claim 12, wherein the disk driving apparatus can be detachably attached a disc-shaped disk, comprising:
a casing enclosing the disk;
wherein the rotator is disposed in the casing and rotates about a rotation axis with respect to the casing, wherein the disk is detachably attached to the rotator, and
wherein the disk tray has a disk mounting part on which the disk is to be mounted, and the disk tray can move between a position in which the center of the disk mounted on the disk mounting part substantially coincides with the rotation axis and a position where the disk can be ejected to the outside of the casing.

* * * * *